Aug. 18, 1953   F. B. SCHUYLER   2,649,295
TRUCK DOCK BUMPER
Filed Nov. 17, 1950
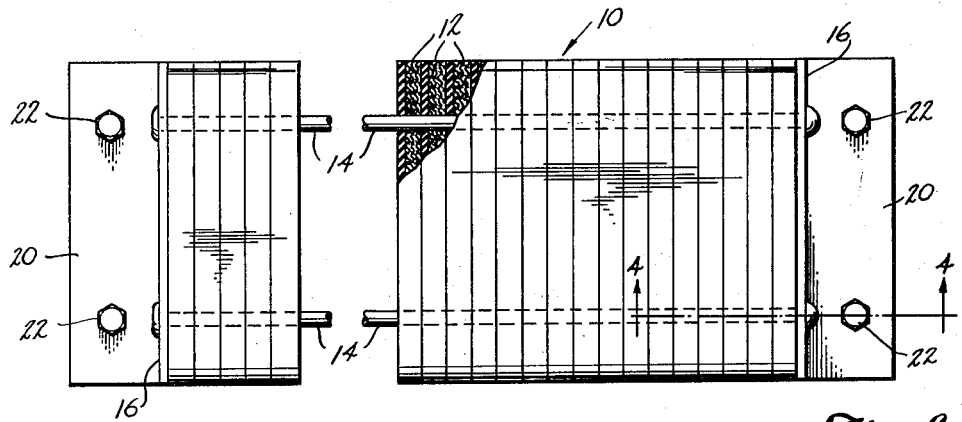
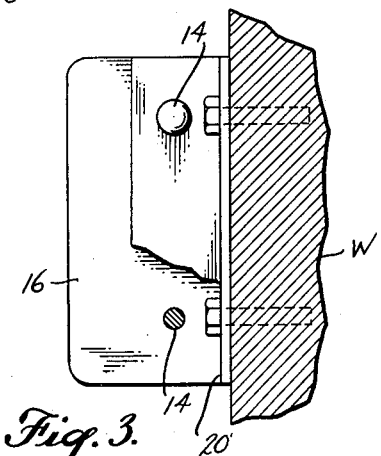
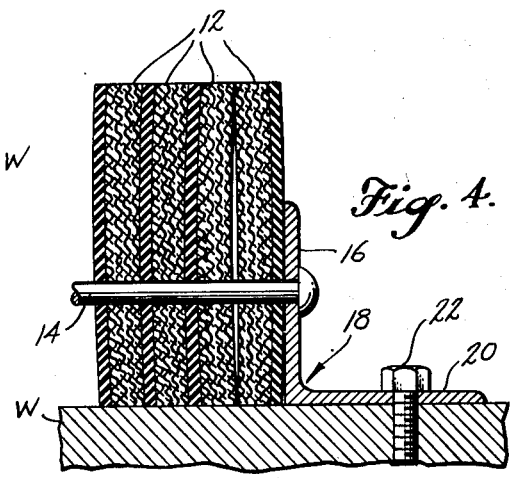
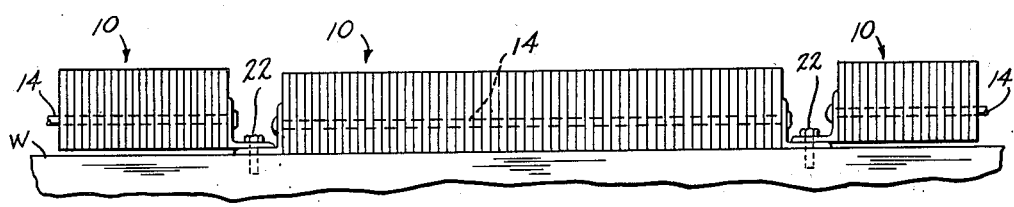
INVENTOR.
FRED B. SCHUYLER
BY
Reynolds, Beach & Christensen
ATTORNEYS Patented Aug. 18, 1953

2,649,295

UNITED STATES PATENT OFFICE 2,649,295

TRUCK DOCK BUMPER

Fred B. Schuyler, near Seattle, Wash., assignor to Durable Mat Company, Seattle, Wash., a corporation of Washington Application November 17, 1950, Serial No. 196,244

2 Claims. (Cl. 267—1)

This invention relates to protective resilient bumpers for truck loading docks and other structures subject to damaging impacts of large vehicles or other heavy mobile equipment. A general object of the invention is an improved, shock-absorbing dock bumper of simple, inexpensive, rugged and durable construction, adapted for mounting on a dock wall, either singly or in groups to cover a selected impact zone.

Experience has revealed that the usual wood or steel protective guards employed in truck loading docks are more expensive than they might seem to be because of the necessity for rather frequent replacements due to impact damage. Moreover, such guards do not tend to soften the impacts of the vehicle with the dock, hence are of little aid in preventing damage of truck parts or breakage of fragile items of freight. It has been evident, therefore, that a relatively inexpensive, conveniently mounted resilient dock bumper, having the necessary ruggedness and wearing qualities, is desirable.

The resilient body portion of the improved dock bumper comprises a plurality of rubber or rubber-like strips, such as sections cut from discarded automobile tire casings, for example, arranged face to face in a stack and held together by bumper mounting structure. Such structure comprises a pair of structural angle brackets having flanges constituting bearing plates, between which the stack of strips is held, and complemental flanges constituting mounting plates projecting endwise from the stack for bolting of the bumper to a dock wall with the individual strips at right angles to the wall. A pair of through-bolts extends through aligned apertures in the stacked strips and interconnects the bearing plate flanges of the brackets to form a rigid mounting structure.

For protection of long walls a number of these bumpers may be mounted in series relationship along an impact zone. Where a group of bumper units are mounted in that manner, it is convenient to overlap the mounting flanges at adjoining ends of adjacent bumper units so that such flanges may be secured to the wall by the same anchor bolts and so that a minimum unprotected gap will be left between successive units.

When the resilient strips making up the body of the bumper are sections cut from discarded automobile tire casings or similar curved stock, there is a tendency for the strips to retain their curvature when mounted in the bumper unit between the structural angle brackets. If this tendency were not overcome to a considerable degree, the strips would tend to buckle more readily than is desired when subjected to edge impacts. A further feature of the invention, therefore, comprises a bumper unit of the type described, in which the end strips are arranged so that their direction of curl is toward the adjoining strips in the stack. Hence, such end strips will not curl appreciably over the adjoining bracket flanges, but will assume a more or less erect position most conducive to resisting impact loads in the planes of the strips.

These and other features, objects and advantages of the invention including certain details of its preferred form of construction will now become more fully evident from the following description based upon the accompanying drawings.

Figure 1 is a plan view showing part of a group of bumper units mounted on a dock wall in horizontal series relationship.

Figure 2 is a front view of an individual bumper unit having parts broken away to show certain details.

Figure 3 is a corresponding end view of the bumper unit mounted on a supporting wall, with parts broken away.

Figure 4 is a fragmentary longitudinal section taken on line 4—4 in Figure 2.

Each bumper unit 10 comprises a plurality of generally rectangular resilient strips of rubber or rubber-like material, such as the fabric-reinforced rubber in automobile tire casings, for example. Preferably the strips are cut from the tread portions of old automobile and truck tire casings in order to minimize the cost of the bumper, the length of such strips extending circumferentially of the tire. Such strips are arranged face-to-face in a stack, the length of which may vary depending upon design requirements or preference. In a typical case the bumper unit will be three or four feet in length.

The stack of resilient strips 12 constitutes the body of the bumper. The strips are apertured to receive the two parallel through-rods 14, which extend through the stack and interconnect corresponding flanges 16 of the structural angle mounting brackets 18, as shown. The bracket flanges 16 function as bearing plates abutting the end strips of the stack over a major portion of their area as shown in Figures 2 and 3, which consequently support the strips against buckling when subjected to edge impacts. As a further step in minimizing the buckling tendency of the strips under impact, care is taken that the endmost strips in the stack, if they tend to curl inherently as they will if cut from old automobile tire casings, for example, curl inward of the stack or toward the adjoining strips therein. As a result the end strips do not curl outward or over the bearing flanges of the brackets, but tend to remain erect, or substantially so, with relation to the wall W upon which the bumper unit is mounted. This may be seen from Figure 4, in which all but the endmost strip in the stack tend to curl to the right in the figure, whereas the righthand strip is facing so that it tends to curl toward the left. Obviously, other strips in the stack, such as those adjacent to the strip at the extreme right of Figure 4, may be disposed to curl in the same direction as it does, except the strip at the opposite end of the stack, which should curl toward the right.

It will be noted in Figure 4 especially, and also in Figure 1, that the tie rods 14 are located at the side of the longitudinal central plane of the bumper remote from its impact surface. Consequently, these rods, being thus offset from the neutral axis, will withstand tension produced by the tendency of the bumper to bend under an impact load. Thus the bumper will have considerable stiffness against bending deflection even when the bumper is spaced outward from the wall W, as shown at the left and right of Figure 1.

The complemental flanges 20 of structural angle brackets 18 constitute mounting plates by which the bumper is mounted against the supporting wall W of the dock. These flanges are preferably coplanar with the back edges of the stacked strips, as shown in Figure 4, so that when the mounting plate flanges are secured to the wall W by bolts 22, such edges abut the wall surface. The middle bumper of the group appearing in Figure 1 is mounted on the wall W in that manner.

However, it is not essential in the improved bumper construction that the rear edges of the resilient strips actually contact the wall surface when the bumper unit is mounted on the wall. In fact, when a series of bumper units are mounted together, it is preferred that the flanges of adjoining ends of adjacent units overlap so that a single set of anchor bolts may be used to secure overlapping flanges to the wall. In such case the bumper units are actually spaced outward an appreciable distance from the wall, namely the thickness of one of the mounting flanges. This is the case with respect to the bumper units whose end portions appear at the right and left, respectively, in Figure 1. Because of the nature of the bumper unit mounting structure comprising the structural angle brackets and the through-rods which hold the resilient strips in a compact stack, the bumper acts as a shock-resisting structural beam, in effect. It is capable of resisting heavy transverse impact loads applied intermediate the ends of the bumper, even though such ends be supported at outward spacing from the dock wall, as in the case of the end units appearing in Figure 1. In functioning as a structural beam of resilient properties, the strips themselves play an important part as a result of being clamped together between the structural angle mountings at the ends of the unit.

While the bumpers may be made in different sizes as previously mentioned, in a typical case a three- or four-foot long bumper unit is made from rectangular strips about five inches by ten inches. The through-rods are of three-fourth's inch diameter round steel, and the structural angle brackets are of standard three-inch angle-iron stock cut to the length of the strips. The strips are, therefore, about two inches wider than the bracket flanges, hence project outward beyond the outer edges of the brackets to receive truck impacts. On the other hand, a three-inch flange constituting a bearing plate engaging the ends of the stack of strips gives sufficient support to the end strips against buckling, so that a wider flange is unnecessary.

While two through-rods are used in each bumper unit, it will be evident that three or more such through-rods might also be used, especially if a much wider bumper were required. On the other hand, a single through-rod in place of the two such rods might be used, although it would have the objectionable feature of permitting rotation of the strips about the rod axis.

In the illustrated case the through-rods have heads at one end and their opposite ends are welded or riveted to form heads while the rubber strips in the stock are held under sufficient clamping pressure between the structural angle brackets to render them substantially planar. Such pressure can be established by holding the assemblage in a press or vise until the ends of the through-rods are appropriately upset or welded on to the flanges 16 to maintain the desired pressure permanently. It will be evident, however, that these rods could take the form of through-bolts, if desired. In such case clamping pressure of the angle irons against the ends of the stack would be exerted by tightening the retaining nuts on the threaded ends of the bolts.

Because the bumper units may be grouped closely together in series as in Figure 1, substantially complete shock protection along a wall of any length may be obtained. They may be secured in place by bolts, lag screws or equivalent means. This and other ways of using the improved bumper units will appear to those familiar with the problem of providing impact protection in truck loading docks or the like.

I claim as my invention:

1. A bumper for truck loading docks or the like comprising a plurality of resilient rubber-like strips arranged face-to-face in stacked relationship, a pair of structural angle brackets having flanges constituting bearing plates abutting the outer strip faces at opposite ends of the stack, respectively, and having their other flanges disposed substantially coplanar with one side of said stack and projecting oppositely endwise therefrom, said stack of strips having apertures therethrough disposed between the side of said strip stack substantially coplanar with such other angle flanges and the central plane of said stack parallel thereto and offset a substantial distance from such plane, and through rod means extending through said bearing plate flanges and said stacked strips' apertures, interconnecting said brackets to retain said strips clamped between the strip-engaging faces of the bearing plate flanges of such brackets, such other flanges of such brackets constituting mounting plates for mounting the bumper by its ends.

2. A bumper for truck loading docks or the like comprising a plurality of resilient rubber-like strips arranged face-to-face in stacked relationship, a pair of structural angle brackets disposed at opposite ends of said strip stack, respectively, having bumper mounting flanges disposed in coplanar relationship and projecting away from said stack of strips with one face of each such flange exposed beyond the corresponding edge of said stack of strips, and each angle bracket having a strip stack clamping flange abutting the outer face of the adjacent end strip in such stack and contacting such strip face over a major portion of its area, said resilient strips and said angle bracket clamping flanges having aligned apertures therein, and through-rod means extending through such aligned apertures in said stacked strips and the clamping flanges of said angle brackets and interconnecting said clamping flanges with said resilient strips clamped therebetween.

FRED B. SCHUYLER.

References Cited in the file of this patent

UNITED STATES PATENTS

| Number | Name | Date |
|---|---|---|
| 1,239,264 | Fitch | Sept. 4, 1917 |
| 1,981,182 | Lyons | Nov. 20, 1934 |
| 2,027,800 | Whitlock | Jan. 14, 1936 |
| 2,062,919 | Maas | Dec. 1, 1936 |

FOREIGN PATENTS

| Number | Country | Date |
|---|---|---|
| 464,342 | France | Jan. 12, 1914 |